United States Patent
Pucci (10) Patent No.: US 9,326,532 B2
(45) Date of Patent: May 3, 2016

(54) PREFORMED ICE CREAM

(71) Applicant: Hannah Grace Pucci, Danbury, CT (US)

(72) Inventor: Hannah Grace Pucci, Danbury, CT (US)

( * ) Notice: Subject to any disclaimer, the term of this patent is extended or adjusted under 35 U.S.C. 154(b) by 86 days.

(21) Appl. No.: 13/742,050

(22) Filed: Jan. 15, 2013

(65) Prior Publication Data

US 2013/0259979 A1 Oct. 3, 2013

Related U.S. Application Data

(60) Provisional application No. 61/616,834, filed on Mar. 28, 2012.

(51) Int. Cl.
*A23G 9/00* (2006.01)
*A23G 9/50* (2006.01)
*A23G 9/44* (2006.01)

(52) U.S. Cl.
CPC *A23G 9/506* (2013.01); *A23G 9/50* (2013.01); *A23G 9/44* (2013.01)

(58) Field of Classification Search
CPC ..... A23L 1/0067; A23L 1/007; A23L 1/0073; A23L 1/0047; A23L 3/363; A23V 2002/00; A21D 13/0029; A23P 1/10; A23P 1/105; B65B 11/00; B65D 85/78; A23G 1/205; A23G 1/21; A23G 9/00; A23G 9/04; A23G 9/083; A23G 9/10; A23G 9/16; A23G 9/221; A23G 9/222; A23G 9/24; A23G 9/245; A23G 9/26; A23G 9/265; A23G 9/28; A23G 9/281; A23G 9/282; A23G 9/283; A23G 9/285; A23G 9/286; A23G 9/287; A23G 9/288; A23G 9/32; A23G 9/322; A23G 9/48; A23G 9/485; A23G 9/40; A23G 9/50; A23G 9/503; A23G 9/506; A23G 9/52; A23G 9/44; A47J 43/282

USPC ........... 426/89, 100, 101, 106, 138, 139, 143, 426/564, 565, 567, 103, 108, 124, 125, 426/130; 220/287, 87.08

See application file for complete search history.

(56) References Cited

U.S. PATENT DOCUMENTS

| | | | |
|---|---|---|---|
| 1,367,848 A * | 2/1921 | Winnie | 426/139 |
| 1,459,638 A | 3/1922 | Rodopulos | |
| 1,684,421 A | 11/1922 | Thompson | |
| 1,656,590 A | 2/1926 | Longstreth et al. | |
| 1,795,153 A | 4/1928 | Thompson | |
| 2,123,215 A * | 7/1938 | Thomas | 426/279 |
| 2,239,046 A | 3/1940 | Lloyd | |
| 2,248,448 A * | 7/1941 | Chester | 426/94 |

(Continued)

OTHER PUBLICATIONS

Cornetto Enigma (Jul. 1, 2010) (http://www.fdin.org.uk/2010/07/walls-launches-new-cornetto-enigma-range/).*

(Continued)

*Primary Examiner* — Jyoti Chawla
(74) *Attorney, Agent, or Firm* — Cantor Colburn LLP (57) ABSTRACT

A preformed serving of a frozen confection configured to be received in a substantially hollow edible container is provided including a body of a frozen confection. A first portion of the body has a shape generally complementary to the edible container. When the body is received within the container, the first portion extends substantially below a surface of the container such that the body of the frozen confection is substantially wedged therein.

4 Claims, 7 Drawing Sheets

(56) References Cited

U.S. PATENT DOCUMENTS

| | | | | |
|---|---|---|---|---|
| 2,695,237 | A | | 1/1950 | Hoff |
| 2,890,122 | A | * | 6/1959 | Katon ............... B65D 1/36 229/406 |
| 2,965,499 | A | * | 12/1960 | Wise .............................. 426/130 |
| 2,976,155 | A | * | 3/1961 | Heller ........................... 426/284 |
| 3,080,830 | A | | 3/1963 | Walter et al. |
| 3,161,156 | A | | 12/1964 | Batista et al. |
| 3,434,849 | A | * | 3/1969 | Carbone ......................... 426/87 |
| 3,510,049 | A | * | 5/1970 | Donovan ............ B65D 85/324 206/521.1 |
| 4,942,910 | A | * | 7/1990 | Hamamura ................... 426/516 |
| 7,213,508 | B2 | | 5/2007 | Staton |
| 2005/0233033 | A1 | * | 10/2005 | Marchon et al. .............. 426/101 |
| 2010/0143560 | A1 | * | 6/2010 | Burmester et al. ............ 426/516 |

OTHER PUBLICATIONS king cone (Mar. 23, 2012) (http://www.google.com/imgres?q=Cornetto+King+Cone&um=1&sa=N&rls=com.microsoft:en-us:IE-SearchBox&biw=1280&bih=800&hl=en&tbm=isch&tbnid=K9uWebhC05fXdM:&imgrefurl=http://www.snackjunkie.de/2012/04/neu-langnese-cornetto-devils-angels-und-cornetto-king-cone-chocolate/&docid=zJhpMcwmlOxlYM&imgurl=http://www.popkulturjunkie.de/sna).*

Nestle Drumstick (Jan. 11, 2008) (http://www.junkfoodblog.com/2008/01/nestle-drumstick-ice-cream-baby-ruth.html#stop-final-loop).*

Nestle Drumstick (Sep. 17, 2011) (http://web.archive.org/web/20110917060130/http://www.rocketdsd.com/Nestle-Drumstick-King-Size-Vanilla__p__951.html).*

Ebay item, "Jello Egg Mold Make Egg Jigglers Make 6 Eggs With Recipes "Brand New" Fun" last updated Apr. 29, 2012, 1 page, http://www.ebay.com/itm/JELLO-EGG-MOLDS-MAKE-EGG-JIGGLERS-MAKE-6-EGGS-WITH-RECIPES-BRAND-NEW-FUN-/160945642837?pt=Kitchen_Tools_Gadgets&hash=item25791b9d55.

PastryChef.com item, "Oval Ice Cream Scoop", searched Jan. 17, 2013, 2 pages, http://www.pastrychef.com/OVAL-ICE-CREAM-SCOOP_p_888.html.

Bluebunny, Scoops sweet and simple, retrieved on Oct. 21, 2013. Retrieved from Internet:,URL: http://www.bluebunny.com/foodservice/scoops/.

* cited by examiner

PREFORMED ICE CREAM

CROSS REFERENCE TO RELATED APPLICATIONS

This application claim priority to U.S. Patent Application No. 61/616,834 filed on Mar. 28, 2012, the entire contents of which is incorporated herein by reference.

BACKGROUND OF THE INVENTION

Exemplary embodiments of this invention generally relate to ice cream and, more particularly, to pre-packaged individual serving of ice cream.

Typically ice cream is served by "scooping" a portion of ice cream from a larger container, such as half-gallon or gallon cardboard container for example, which is generally stored in a freezer. When the ice cream is removed from the freezer, the container of ice cream may be frozen solid making it difficult to scoop a portion of ice cream from the container. Depending on the hardness of the ice cream, the amount of ice cream gathered during a single scooping motion may vary significantly, which creates a potential for both under-serving, scooping less than an intended serving size, and over-serving, scooping more than an intended serving size. When trying to place the ice cream onto the cone, the ice cream has a tendency to fall off the cone. Alternatively, the force needed to securely position the ice cream about the cone frequently causes the cone to fracture or break.

As a result, there is a need for a serving of ice cream that can be easily and consistently served.

BRIEF DESCRIPTION OF THE INVENTION

According to one embodiment of the invention, a pre-formed serving of a frozen confection configured to be received in a substantially hollow edible container is provided including a body of a frozen confection. A first portion of the body has a shape generally complementary to the edible container. When the body is received within the container, the first portion extends substantially below a surface of the container such that the body of the frozen confection is substantially wedged therein.

According to an alternate embodiment of the invention, an edible assembly is provided including a substantially hollow edible container configured to receive a frozen confection. The edible assembly also includes a pre-formed serving of a frozen confection. The pre-formed serving includes a first portion having a shape generally complementary to the substantially hollow edible container. The first portion extends substantially below a surface of the edible container such that the frozen confection is substantially wedged therein.

According to yet another embodiment of the invention, a frozen confection assembly is provided including a plurality of pre-formed servings of a frozen confection. A first portion of each pre-formed serving has a shape generally complementary to an edible container. When the pre-formed serving is received within the edible container, the first portion extends substantially below a surface of the edible container such that the pre-formed serving of the frozen confection is substantially wedged therein. The assembly additionally includes a package having a plurality of inlets. Each inlet is configured to receive one of the plurality of pre-formed servings of a frozen confection. Each inlet is generally complementary to the first portion of the pre-formed servings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
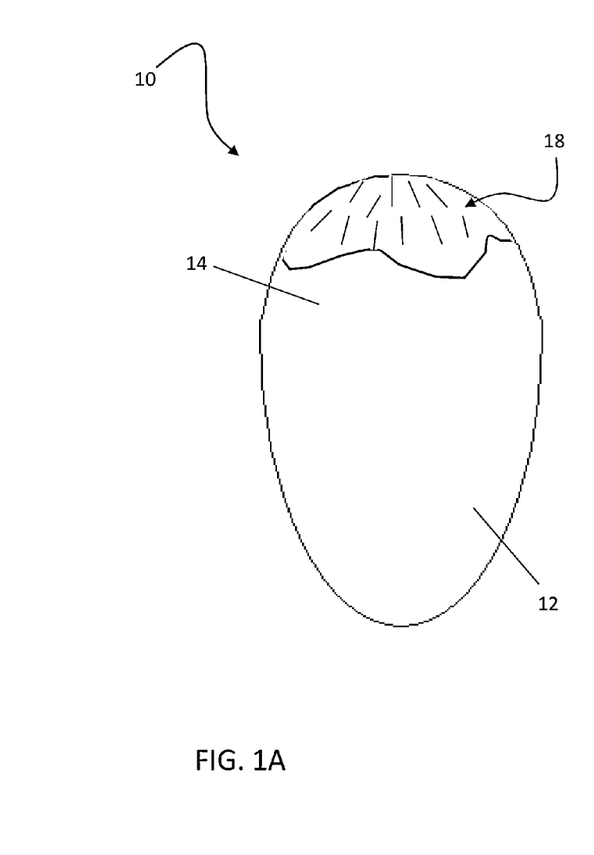
FIG. 1A is a side view of an of a frozen confection according to an embodiment of the invention.
Figure 1B:
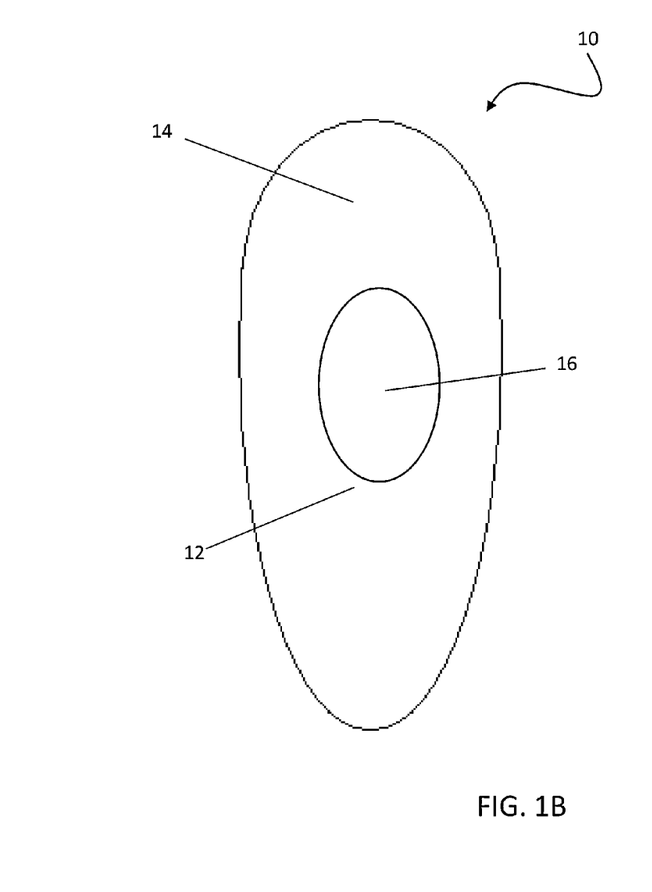
FIG. 1B is a cross-section of a pre-formed serving of a frozen confection according to an embodiment of the invention.
Figure 2:
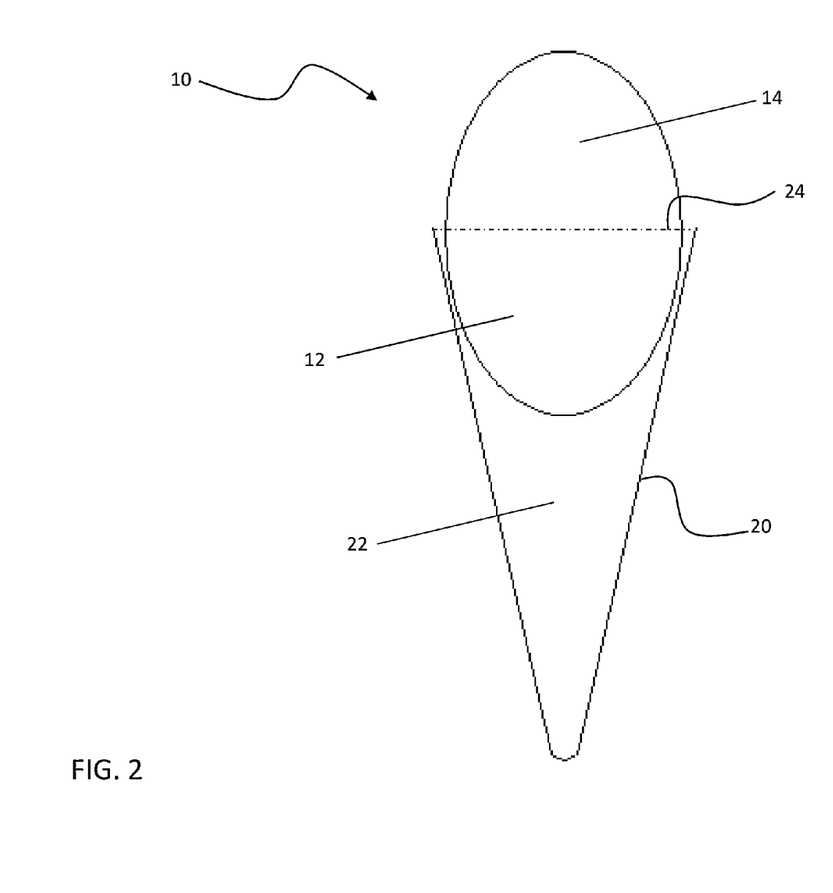
FIG. 2 is a cross-section of a pre-formed serving of a frozen confection received within an edible container according to an embodiment of the invention.
Figure 3:
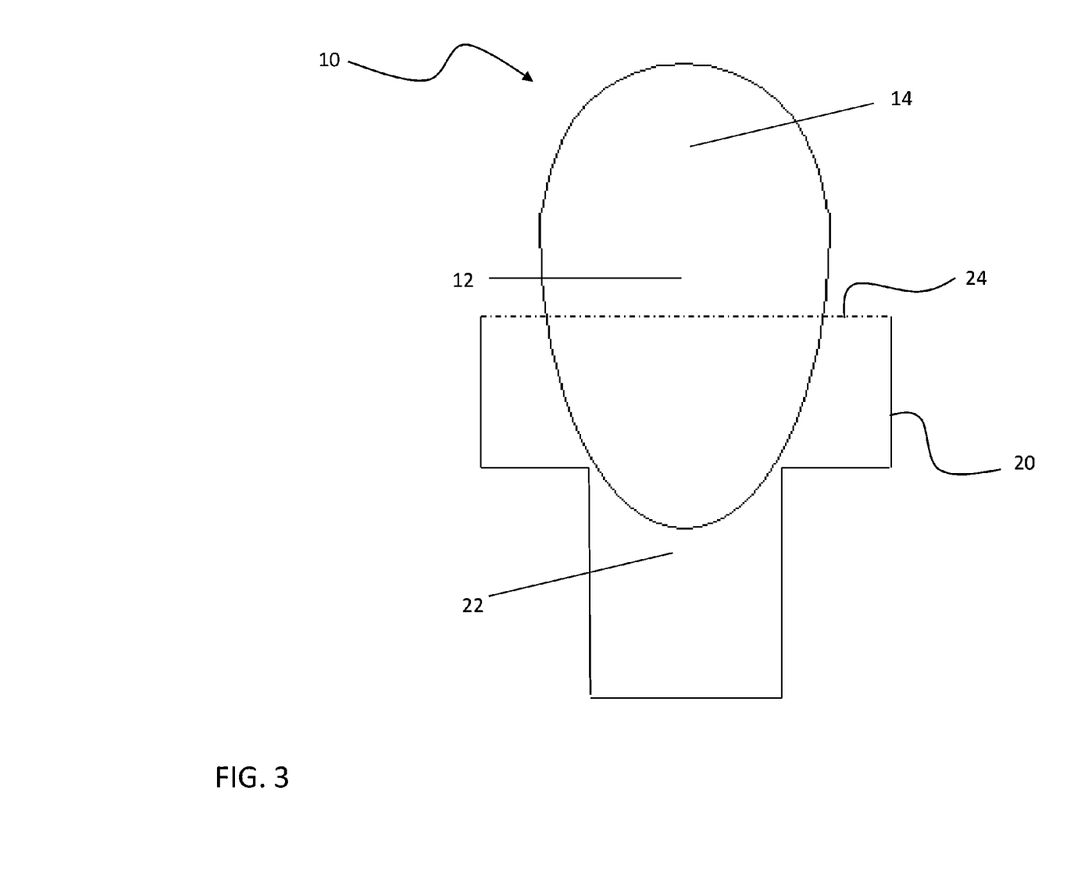
FIG. 3 is a cross-section of a pre-formed serving of a frozen confection received within an edible container according to another embodiment of the invention.

Referring now to the FIGS., a pre-formed serving of an edible frozen confection 10 is illustrated. Exemplary embodiments of the frozen confection 10 include, but are not limited to, aerated frozen confections including ice cream, frozen yogurt, and frozen greek yogurt, and non-aerated frozen confections, such as gelato for example. In general, the pre-formed frozen confection 10 is intended for use with an edible, substantially hollow container 20, such as a sugar cone, wafer cone, or waffle cone for example. However, the frozen confection 10 may be used with other non-edible containers as well, for example dishes and cups. In one embodiment, the shape of the pre-formed frozen confection 10 is complementary to the shape of an edible container 20, for example an ice cream cone. The frozen confection 10 may be shaped such that a first, lower portion 12 of the frozen confection 10 is configured to extend into the opening 22 substantially below the surface 24 when inserted into the cone 20 such that the frozen confection 10 is wedged into and therefore secured within the cone 20, as illustrated in FIGS. 2 and 3. A second, upper portion 14 of the frozen confection 10 may similarly be configured to extend substantially above the surface 24 of the opening 22 when inserted into the cone 20 for easy access by a consumer. In one embodiment, the pre-formed frozen confection 10 is generally oval in shape, similar to an egg (FIG. 1A). However, the frozen confection 10 may be any shape including a combination of shapes, including but not limited to ovoid, ellipsoid, conical or frustoconical for example. For example, in the non-limiting embodiment illustrated in FIG. 1B, the upper portion 14 of the frozen confection 10 may be generally semi-spherical and the lower portion 12 of the frozen confection 10 may be substantially ellipsoid in shape.

In one embodiment, the volume of each pre-formed serving of frozen confection 10 may be generally equivalent to the volume of "single scoop" or a single serving (e.g. ½ cup) of ice cream gathered using a conventional ice cream scoop. However, the size and shape of the pre-formed frozen confection 10 may be adaptable or scalable to create a pre-formed frozen confection 10 of any serving size, such as equivalent to a "double scoop" or "triple scoop" for example.

Referring again to FIGS. 1A and 1B, each pre-formed serving of a frozen confection 10 has a first flavor. However, the frozen confection 10 may alternatively include a second, distinct flavor, or a filling 16, such as chocolate for example, arranged generally at the center of the interior of the pre-formed frozen confection 10. In one embodiment, the pre-formed frozen confection 10 may also include one or more toppings 18, including but not limited to, sprinkles, a sauce (i.e. chocolate, or caramel), fruit, candy, and nuts for example.

Figure 4:
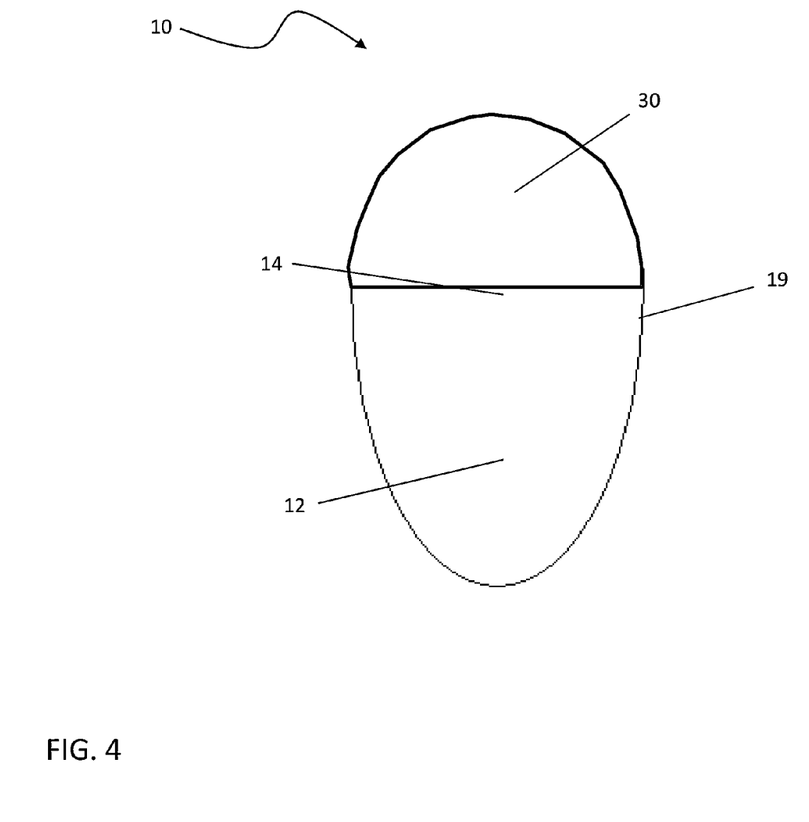
FIG. 4 is a side view of a pre-formed serving of a frozen confection including a hygienic wrapper according to an embodiment of the invention.

Referring now to FIG. 4, the pre-formed frozen confection 10 may additionally include a removable wrapper 30 extending at least partially about the circumference of the frozen confection 10, such as about the circumference of the upper portion 14 for example. The wrapper 30 is configured to provide an area for a person to grasp or hold the frozen confection 10 in a sanitary manner while inserting the frozen confection 10 into a desired container. In the non-limiting embodiment disclosed in the FIG., the wrapper 30 generally covers the majority of the upper portion 14 of the frozen confection 10. The wrapper 30 may be formed from a material, such as a laminated or wax-like material for example, that is easy to remove from the surface 19 of the frozen confection 10 when the frozen confection 10 is ready to be eaten.

Figure 5:
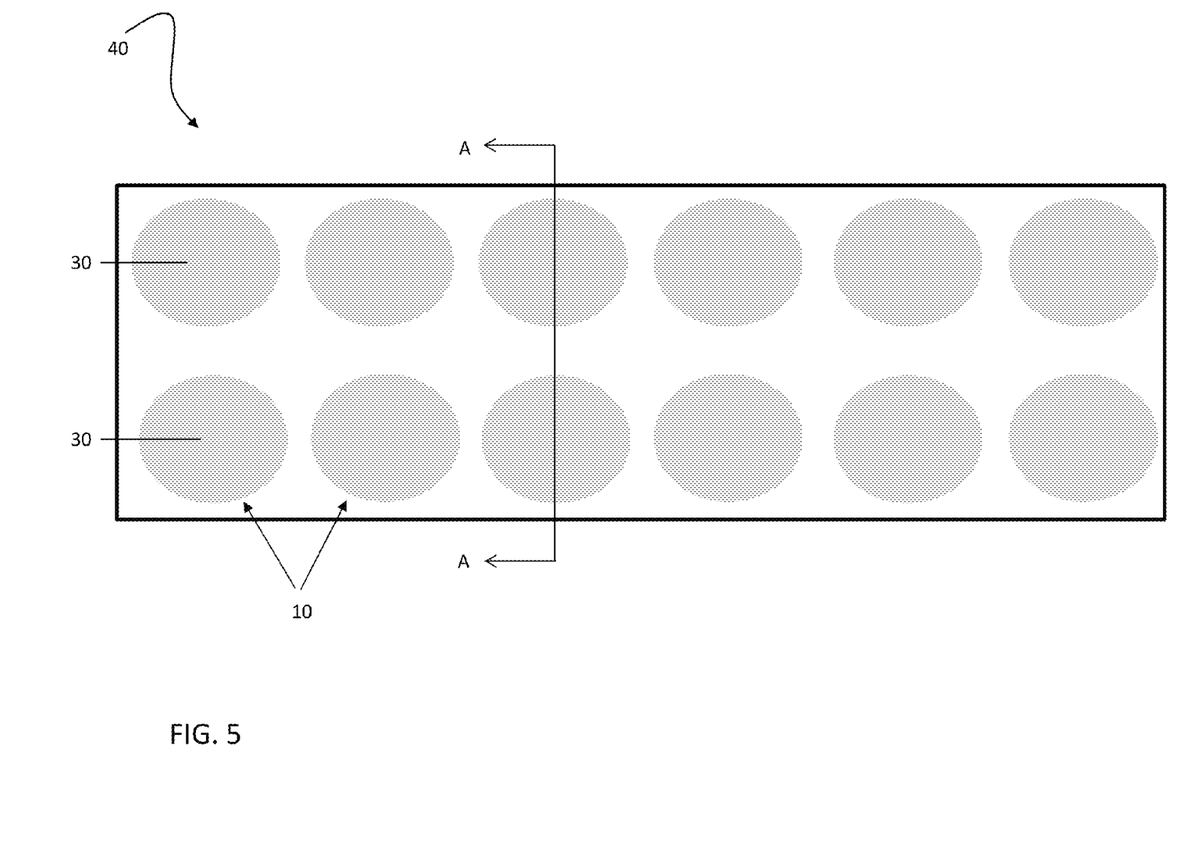
FIG. 5 is a top view of a package configured to hold a plurality of pre-formed servings of a frozen confection according to an embodiment of the invention.
Figure 6:
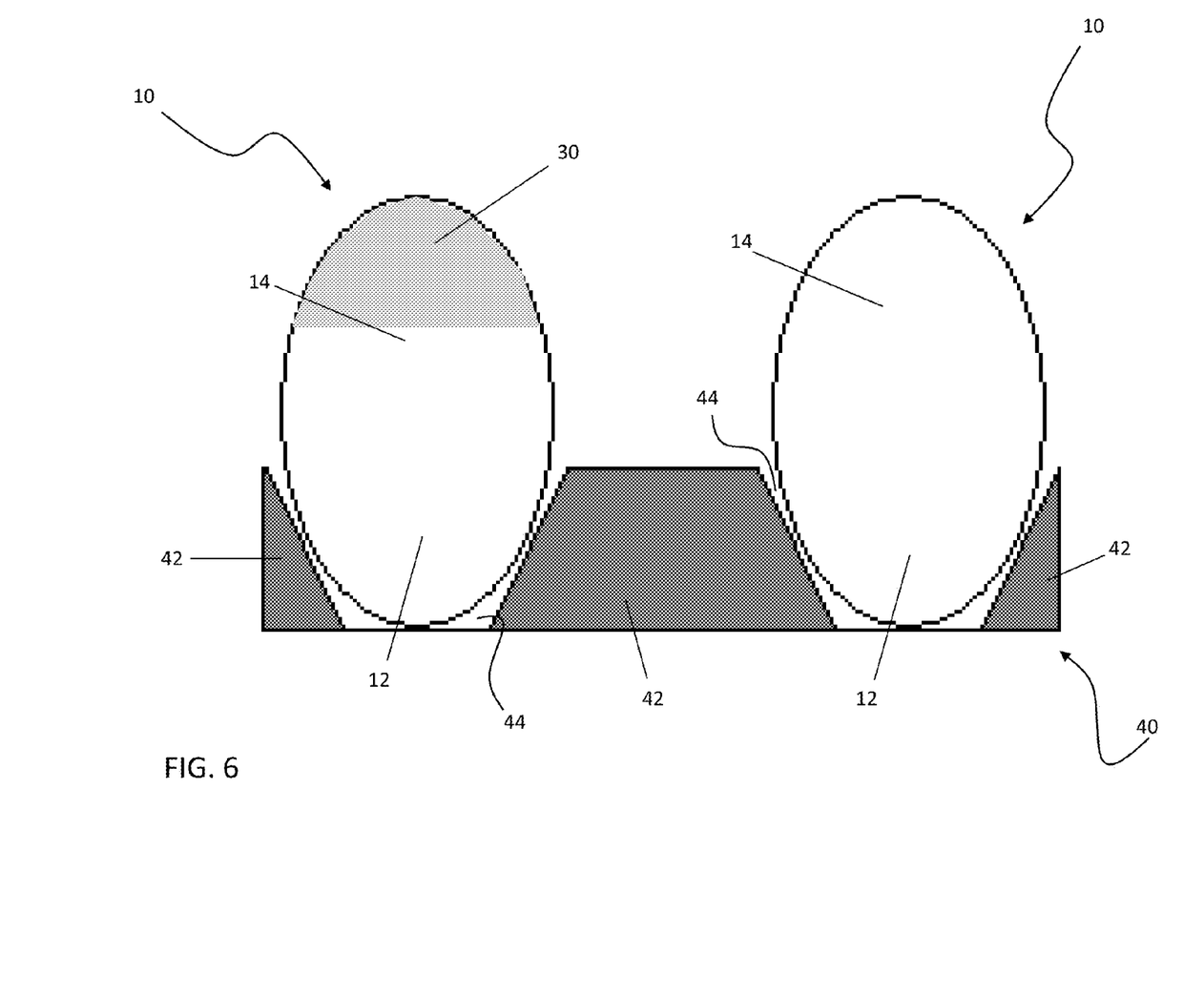
FIG. 6 is a cross-section of the package illustrated in FIG. 4 according to an embodiment of the invention.

In one embodiment, a plurality of pre-formed servings of a frozen confection 10 may be packaged in a single package 40 (see FIGS. 5 and 6). The plurality of pre-formed frozen confections 10 may have a substantially similar flavor or may include a variety of flavors. In one embodiment, each frozen confection 10 in the package 40 is a different flavor. Though the illustrated package is configured to store twelve pre-formed servings of a frozen confection 10, a package configured to hold any number of pre-formed servings of a frozen confection 10 is within the scope of the invention. FIG. 6 is a cross-section of the exemplary package 40 of FIG. 5, taken along line A-A. As illustrated, the package 40 may include a plurality of sidewalls 42 that form substantially surrounded inlets 44, each of which is configured to receive one of the plurality of pre-formed servings of a frozen confection 10. In one embodiment, the contour of each inlet 44 is complementary to the lower portion 12 of each pre-formed frozen confection 10 and is configured to retain the frozen confection 10 in a substantially vertical or upright position. In embodiments where the pre-formed servings of a frozen confection 10 are generally oval or egg-shaped, the package 40 may be similar to an egg carton.

Figure 7:
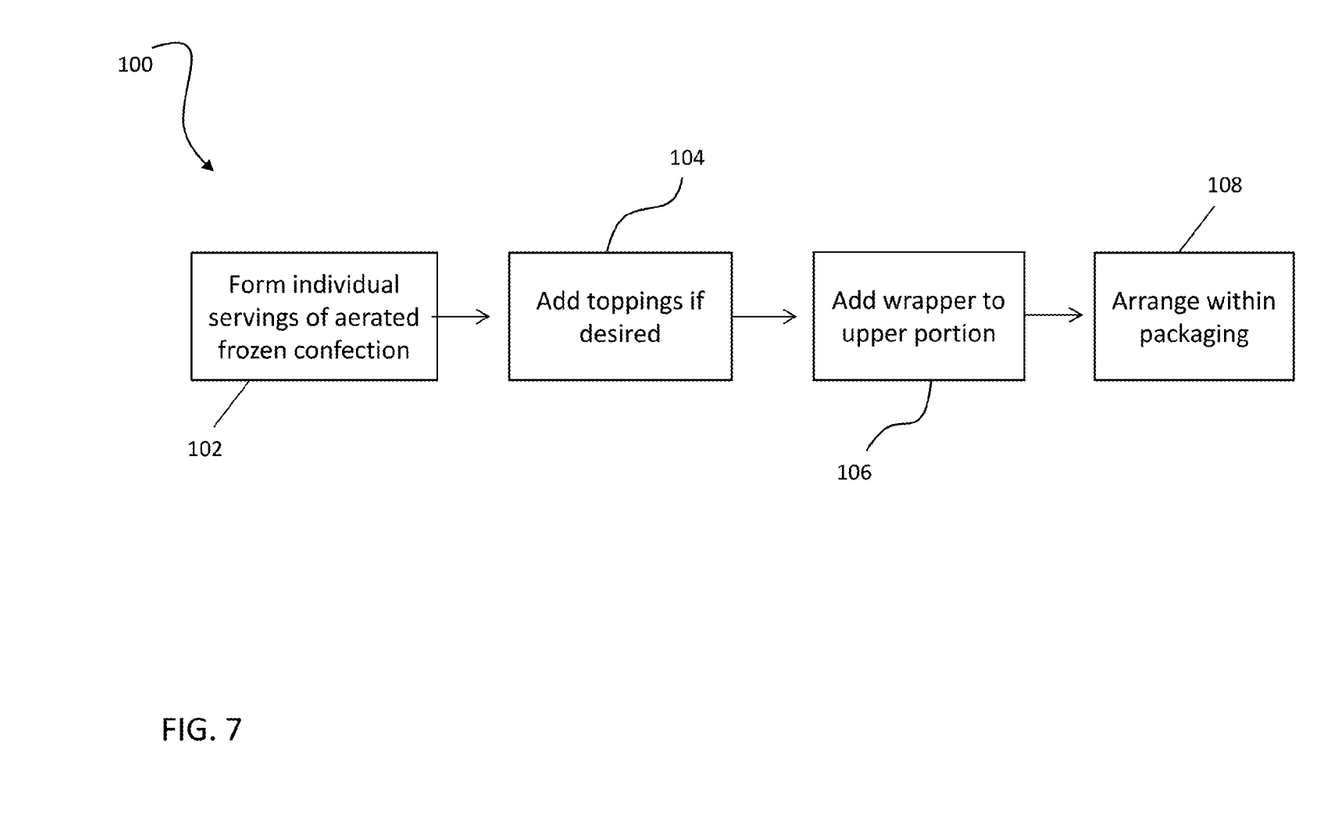
FIG. 7 is a schematic diagram of a process for manufacturing and preparing to sell pre-formed servings of a frozen confection according to an embodiment of the invention.

Referring now to FIG. 7, a process 100 for producing and preparing for sale the pre-formed servings of a frozen confection 10 is illustrated. As illustrated in block 102, the frozen confection 10 may be manufactured using any of a number of processes. For example, each serving of a frozen confection 10 may be extruded, such as through an adjustable nozzle for example, using a known extrusion process common to the frozen confection industry. Alternatively, the frozen confection 10 may be formed using a mold. In one embodiment, a substantially softened frozen confection may be filled into a mold of a desired shape. After the frozen confection 10 has hardened into the desired shape, the frozen confection 10 is removed from the mold. In another embodiment, an already hardened frozen confection 10 may be punched or stamped into a mold having a desired shape. In embodiments where the frozen confection 10 includes toppings, the toppings may be added during or after the formation of the frozen confection 10 into the desired shape, as shown in block 104. When the formation of each pre-formed serving of a frozen confection 10 is complete, a hygienic wrapper 30 is added to a portion of the frozen confection 10 (see block 106). As illustrated in block 108, after installation of a wrapper 30, a plurality of frozen confections 10 may be arranged within a package 40 and sealed.

The invention provides pre-packaged individual servings of a frozen confection 10. By pre-forming a serving of a frozen confection 10 into a shape complementary to a cone or other edible container 20, each serving of the frozen confection 10 may easily be inserted and retained within the edible container 20. As a result, the integrity of the edible container 20 is maintained while the frozen confection 10 is inserted therein. Unlike the containers of frozen confections currently available, each package 40 may include a variety of flavors, thereby increasing the appeal of the package 40 to a greater number of people. Use of the invention in commercial applications, such as restaurants for example, will eliminate the potential for under serving or over serving. In addition, the amount of time required to prepare a servings of a frozen confection for a customer will be greatly reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A pre-formed serving of a frozen confection, comprising:
    a body of frozen confection that is egg shaped and arranged within a package absent a hollow edible container, the body of frozen confection having an integrally formed first portion and a second portion, the first portion of the body of frozen confection configured to fill only a portion of the hollow edible container when initially inserted therein, the first portion also being configured to wedge within the hollow edible container to secure the body of frozen confection thereto, the second portion of the body of frozen confection extends in a direction substantially opposite the first portion of the body of frozen confection; and
    a removable wrapper that extends about the circumference of the second portion of the body of frozen confection, contacts the second portion of the body of frozen confection, and comprises an area to grasp and hold the body of frozen confection in a sanitary manner when inserting the body of frozen confection into the hollow edible container, wherein the removable wrapper does not completely cover the body of frozen confection, and the removable wrapper comprises a laminated or wax material.

2. The pre-formed serving of a frozen confection according to claim 1, wherein at least one topping is arranged on the second portion of the body of frozen confection.

3. The pre-formed serving of a frozen confection according to claim 1, wherein a filling is generally arranged at a center of the body of frozen confection.

4. The pre-formed serving of a frozen confection according to claim 1, wherein the body of frozen confection has a first flavor and a generally central portion of the body has a second flavor, different from the first flavor.

* * * * *